No. 838,319. PATENTED DEC. 11, 1906.
J. GREEN.
CAR TRUCK.
APPLICATION FILED AUG. 31, 1905.
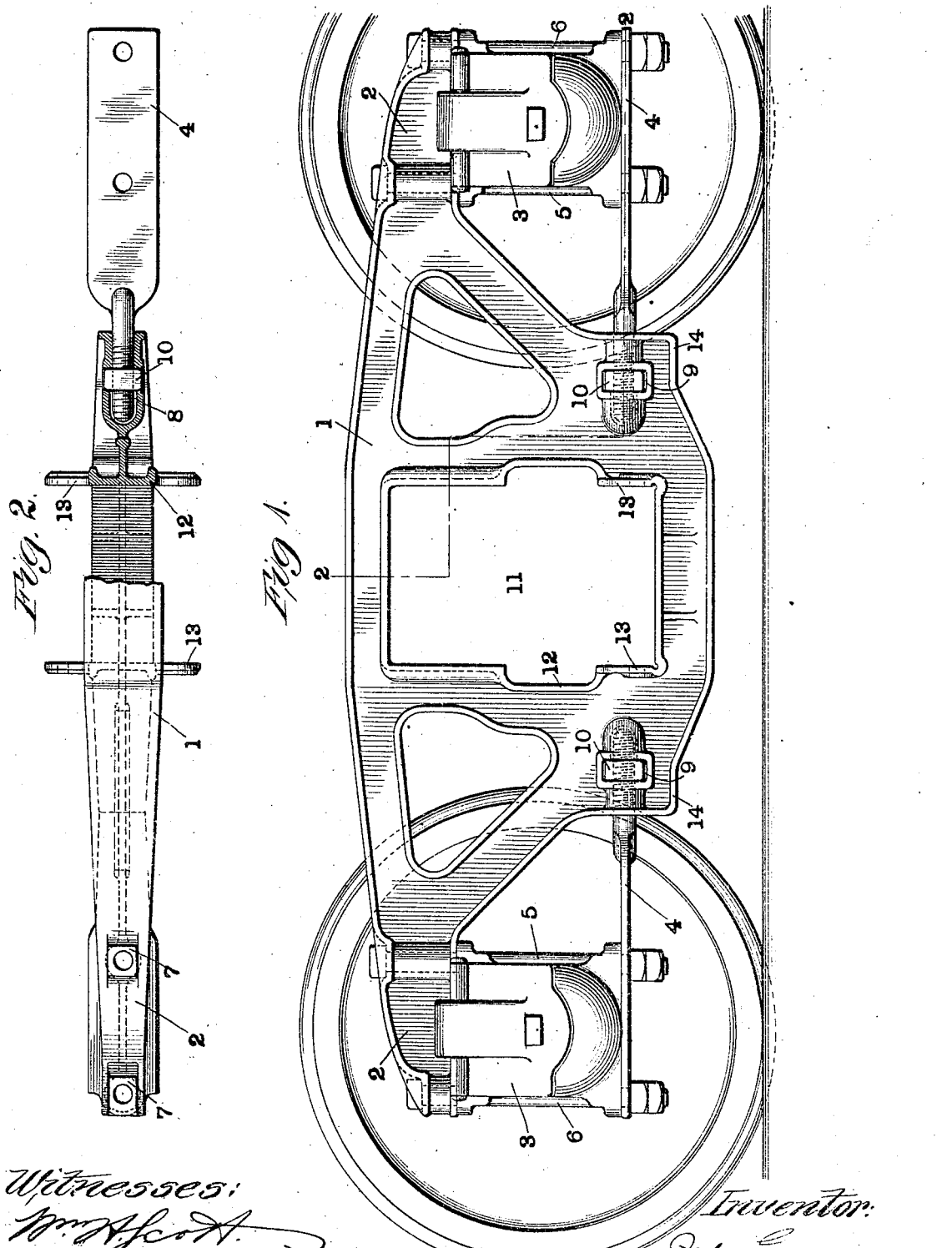

UNITED STATES PATENT OFFICE.

JOHN GREEN, OF ST. LOUIS, MISSOURI, ASSIGNOR TO J. S. ANDREWS & COMPANY, OF NEW YORK, N. Y., A CORPORATION OF NEW YORK.

CAR-TRUCK.

No. 838,319.     Specification of Letters Patent.     Patented Dec. 11, 1906.

Application filed August 31, 1905. Serial No. 276,491.

*To all whom it may concern:*

Be it known that I, JOHN GREEN, a citizen of the United States, and a resident of the city of St. Louis and State of Missouri, have invented a new and useful Improvement in Car-Trucks, of which the following is a specification.

My invention relates to car-trucks, and has for its principal objects to produce a cast-steel car - truck which shall be light and strong; to provide a truck having the bearing - boxes so connected that they can be removed or turned only by removing the bolts; to provide a car-truck from which the bearing-boxes may be removed in a lateral direction when the bolts are removed without raising the side frame; to provide a retaining-bar for the bearing-boxes which cannot be removed so long as the bearing-boxes are in place; to provide a car-truck having means to prevent rotation of the bolts for securing the bearing-boxes; to increase the bearing-surface of the columns, and other objects hereinafter more fully appearing.

My invention consists in the parts and in the arrangements and combinations of parts hereinafter described and claimed.

In the accompanying drawings, forming a part of this specification, and wherein like symbols refer to like parts wherever they occur, Figure 1 is a side view of the truck, the bolster, springs, and cross-tie being omitted to avoid obscuring the columns. Fig. 2 is a view, partly in plan and partly in section, on the line 2 2 of Fig. 1, of one of the side frames.

The car-truck incorporates side frames 1, preferably of cast-steel. Shoulders 2 project from each of the upper corners of the body portion of the side frames. The lower surfaces of said shoulders are substantially horizontal and are arranged to rest upon journal-boxes 3. The shoulders and body portion of the side frames form journal-box-receiving recesses, which are open at one end and at the bottom. The journal-boxes riding upon the wheel-axles can thus be moved into place beneath the shoulders 2 without raising the side frames materially above the position they will assume when resting on the journal-boxes. The journal-boxes are retained in place by retaining-bars 4 and bolts 5 6 passing through said shoulders 2, the ears of the journal-boxes 3, and said retaining-bars 4.

At the points at which the holes to receive the bolts 5 6 pass through the shoulders 2 substantially cylindrical enlargements are provided containing at least as much metal as is removed to make the holes. Upon the top said shoulders are provided with polygonal recesses 7, centrally alined with the bolt-receiving holes and having the shape of the heads of the bolts 5 6—in the case illustrated square. The heads of the bolts resting in these recesses, rotation of the bolts is impossible. It is thus easy to apply the nuts to the bolts.

Each retaining-bar 4 has a flat portion which fits beneath the journal-box and a cylindrical portion or shank which is screw-threaded. The body of the side frame is provided at each of its lower corners with a horizontal hole 8 to receive the screw-threaded shank of the retaining-bar. Substantially rectangular holes 9 intersect said holes 8 and receive square nuts 10, which fit snugly therein and have screw-threaded engagement with the retaining-bars. The nut is positively held against rotation.

In assembling the truck the retaining-bars are screwed into the holes 8 through the square nuts 10 until the bolt-holes are in alinement with the bolt-holes in the shoulders 2. The wheels carrying the journal-boxes are then rolled into place, the bolts 5 6 inserted, and the nuts applied. The retaining-bar is sufficiently flexible to provide for the irregularities in the size and surface of the cast journal-boxes. When the parts have been so assembled, the journal-boxes cannot possibly be removed until the bolts are taken out. If the nuts should be lost, the journal-boxes would still be held in place, for the lower ends of the bolts would still be supported by the retaining-bars, the latter being firmly held in a horizontal position. The retaining-bars cannot be removed so long as the journal-boxes or the bolts are in place, for it is necessary to turn them about their horizontal axes in order to remove them, and this will be effectually prevented either by the journal-boxes or the bolts. The strain upon the retaining-bars is almost entirely tensional or compressional, and hence the chance of breaking them is very remote.

The side frames 1 are each provided with a centrally-located bolster-receiving opening 11, which is entirely surrounded by flanges 12, extending on both sides of the web of the frame. At the lowest part of the opening the flanges are given such an extent as to form ears 13, to which the cross-tie and spring-seat may be secured. The lower medial portion of the opening is wider than the upper portion. The width of this portion is slightly greater than the width of the end of a bolster measured over the column-guides. The bolster can thus be inserted at this point and then raised, the column-guides engaging the sides of the upper portion of the opening which constitute the columns of the side frame. The flanges at the sides of the upper portion of the opening are substantially L-shaped, having one part extending in a direction parallel with the web of the frame. This gives the columns a bearing-surface at least equal to the bearing-surface of the column-guides of the bolster and insures regularity of wear, besides reducing the depth of wear.

The body portion of the side frame is provided at its lower corners with horizontal surfaces or seats 14 of sufficient extent to afford a seat for a lifting-jack.

Obviously my device is capable of considerable modification within the scope of my invention, and therefore I do not wish to be limited to the specific construction shown and described. For example, the holes 8 in the side frames may be screw-threaded to receive the screw-threaded ends of the journal-box-retaining bars 4 and the use of the nuts 10 may be avoided.

What I claim as my invention, and desire to secure by Letters Patent, is—

1. A car-truck comprising side frames provided with journal-box-receiving recesses, detachably-mounted journal-box-retaining bars closing one side of said recesses and being rotatably movable about longitudinal axes, journal-boxes mounted in said recesses and engaging said bars, said engagement preventing rotation of said bars, and bolts securing said journal-boxes in place.

2. A car-truck comprising side frames provided with journal-box-receiving recesses, detachably-mounted journal-box-retaining bars closing one side of said recesses and being longitudinally movable, journal-boxes mounted in said recesses and engaging said bars, and bolts passing through said journal-boxes and said bars and preventing said longitudinal movement of said bars.

3. A car-truck comprising side frames provided with journal-box-receiving recesses, detachably-mounted journal-box-retaining bars closing one side of said recesses and being rotatably and longitudinally movable, journal-boxes mounted in said recesses and engaging said bars, and bolts passing through said journal-boxes and said bars, said engagement of said bars with said journal-boxes and said bolts preventing said rotatory and longitudinal movement of said bars.

4. A car-truck comprising side frames provided with journal-box-receiving recesses, journal-boxes mounted in said recesses, a detachably-mounted journal-box-retaining bar for each of said recesses closing one side thereof, said bars being held against removal by engagement with said journal-boxes, and bolts securing said journal-boxes in place.

5. A car-truck comprising side frames provided with journal-box-receiving recesses, journal-boxes mounted in said recesses, journal-box-retaining bars having screw-threaded shanks entering the body portions of said side frames and flat faces engaging said journal-boxes, said side frames and journal-boxes having alined bolt-holes and bolts passing through said alined bolt-holes.

6. A car-truck comprising side frames provided with journal-box-receiving recesses, journal-boxes mounted in said recesses, nuts non-rotatably mounted on the body portions of said side frames, journal-box-retaining bars having screw-threaded engagement with said nuts and so engaging said journal-boxes as to prevent rotation of said bars, and bolts securing said journal-boxes in place.

7. A car-truck comprising side frames each having a body portion and projecting shoulders at its upper corners integral therewith, the lower surface of said shoulders being plane and arranged to be seated on journal-boxes, a journal-box-retaining bar detachably connected to each of the lower corners of said body portion of said side frames and arranged to engage the lower side of the corresponding journal-box, journal-boxes mounted between said shoulders and said bars, and bolts securing said journal-boxes in place.

8. A truck side frame comprising a body portion, shoulders at the upper corners of said body portion and integral therewith, the lower surfaces of said shoulders being substantially horizontal, and detachable bars mounted on the frame above its lower corners and substantially rigidly held parallel with the lower surfaces of said shoulders.

9. A truck side frame comprising a body portion, shoulders at the upper corners of said body portion and integral therewith, the lower surfaces of said shoulders being substantially horizontal and detachable bars upon the lower corners of said body portion and substantially rigidly held in a position parallel with the lower surfaces of said shoulders but being rotatable about a horizontal axis.

10. A truck side frame comprising a body portion, shoulders at the upper corners of said body portion and integral therewith, the lower corners of said body portion being provided with intersecting holes, a nut non-rotatably mounted in one of each set of intersecting holes and a bar mounted in the other of said holes and engaging said nut.

11. A truck side frame comprising a body portion, shoulders at the upper corners of said body portion and integral therewith, the lower corners of said body portion being provided with round holes extending longitudinally and polygonal holes intersecting said round holes, polygonal nuts non-rotatably mounted in said polygonal holes, and bars mounted in said round holes and having screw-threaded engagement with said nuts.

In witness whereof I have signed my name to this specification, in the presence of two subscribing witnesses, at St. Louis, Missouri, this 29th day of August, 1905.

JOHN GREEN.

Witnesses:
JAMES A. CARR,
J. B. MEGOWN.